P. S. BAUER.
ADHESIVE PLASTER SPOOL.
APPLICATION FILED FEB. 2, 1911.
1,023,236.
Patented Apr. 16, 1912.
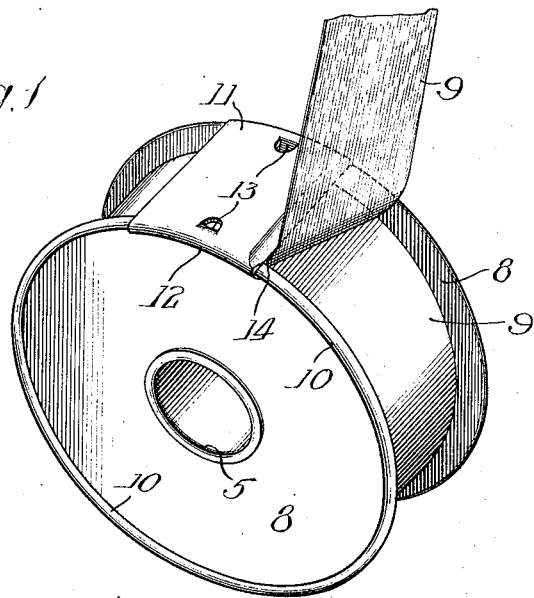
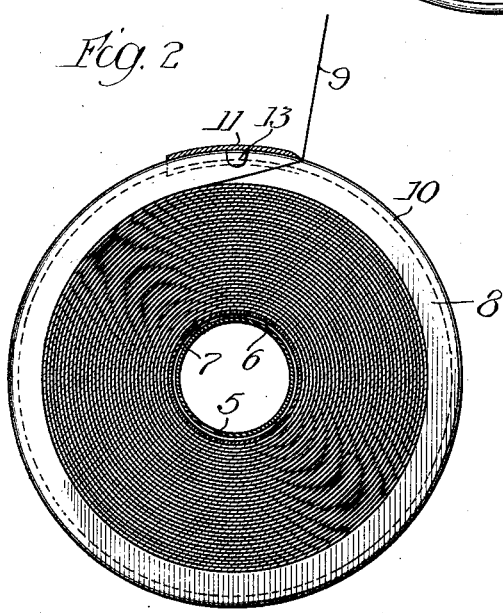
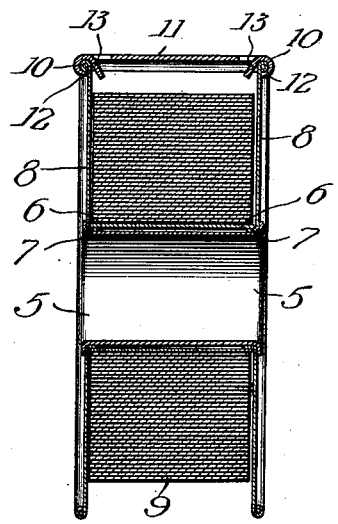
Witnesses:
Inventor:
Perry S. Bauer
by Linthicum Belt & Fuller
Attys.

UNITED STATES PATENT OFFICE.

PERRY S. BAUER, OF CHICAGO, ILLINOIS, ASSIGNOR TO BAUER & BLACK, OF CHICAGO, ILLINOIS, A CORPORATION OF ILLINOIS.

ADHESIVE-PLASTER SPOOL.

1,023,236.  Specification of Letters Patent.  Patented Apr. 16, 1912.

Application filed February 2, 1911. Serial No. 606,231.

*To all whom it may concern:*

Be it known that I, PERRY S. BAUER, a citizen of the United States, residing at Chicago, in the county of Cook and State of Illinois, have invented certain new and useful Improvements in Adhesive-Plaster Spools, of which the following is a specification.

This invention relates to spools and particularly to spools which are intended to hold adhesive-plaster, tape or other similar material, and the principal aim of the invention is the provision of a novel and improved cutter for cutting off a required length of material which has been unwound from the spool.

The invention will be best understood by reference to the following description when taken in connection with the accompanying drawings illustrating one preferred embodiment thereof, in which—

Figure 1 is a perspective view of a spool embodying my invention. Fig. 2 is a transverse sectional view; and Fig. 3 is a longitudinal sectional view thereof.

From the drawings it will be observed that the spool comprises a central core 5 surrounded by a band 6 of larger diameter than the core. The inturned ends or flanges 7 of the spool ends 8 are disposed between the core 5 and surrounding band 6, said ends being secured in position by upsetting or swaging the ends of the core over the adjacent portions of the ends. The ends when secured in position are arranged in substantially parallel relation and are spaced apart a sufficient distance to permit a strip of adhesive tape 9 or any other preferred material to be wound up on the spool between said ends. It will be obvious that the length of the spool may be varied to accommodate strips of material of any desired width.

Each end of the spool is provided upon its outer face with a peripheral bead or rib 10. A cutter 11 is curved transversely to conform to the curvature of the circumference of the spool ends, as shown in Fig. 2, and is slidably attached to the peripheries of the spool ends by bending the ends 12 of the cutter around the beads 10, as shown in Fig. 3. The attachment of the cutter to the spool ends may be strengthened by cutting and bending downwardly projections 13 which engage with the inner edges of the beads 10. These projections 13 serve to prevent the peripheries of the spool ends from being pressed together so as to disengage the cutter therefrom. One longitudinal edge of the cutter is sharpened to produce a cutting edge 14.

The cutter as will be readily understood slides freely around the peripheries of the spool ends so that it will not interfere with the tape either during the winding or unwinding of the spool. When it is desired to use a piece of the wound up tape the required length is unwound from the spool then, with the thumb of the hand holding the spool pressed upon the upper face of the cutter to hold it immovable on the spool, the tape may be readily and easily severed by drawing it across the sharp edge of the cutter.

From the foregoing it is thought that the construction, operation and many advantages of the herein-described invention will be apparent without further description and it will be readily understood that various changes in the size, proportion and arrangement of the various parts may be resorted to without departing from the spirit of the invention or sacrificing any of the material advantages thereof.

I claim:

1. The combination of a spool having a bead formed upon the periphery of each of the ends thereof, and a cutter slidably embracing said beads whereby the cutter may be moved entirely around the periphery of the spool.

2. The combination of a spool provided with parallel ends spaced apart, each of said ends having a peripheral bead upon its outer face, and a cutter slidably embracing the beads on said ends.

3. The combination of a spool having parallelly arranged ends provided with circumferential beads, and a cutter disposed longitudinally of the spool and having each end bent to embrace said beads whereby the cutter is slidably attached to the ends of said spool.

4. The combination of a spool having a bead formed upon the periphery of each of the ends thereof, and a cutter comprising a blade shaped to engage the periphery of the ends and having its extremities bent to slidably embrace the said bead.

5. The combination of a spool having a circular end provided with a bead formed upon its periphery, and a cutter shaped to engage the said end, said cutter having an inwardly depending ear adapted to engage with the said end, and said cutter having its extremity beyond the said end bent to embrace the said bead.

PERRY S. BAUER.

Witnesses:
 Wm. O. Belt,
 M. A. Kiddie.